Patented Sept. 1, 1953

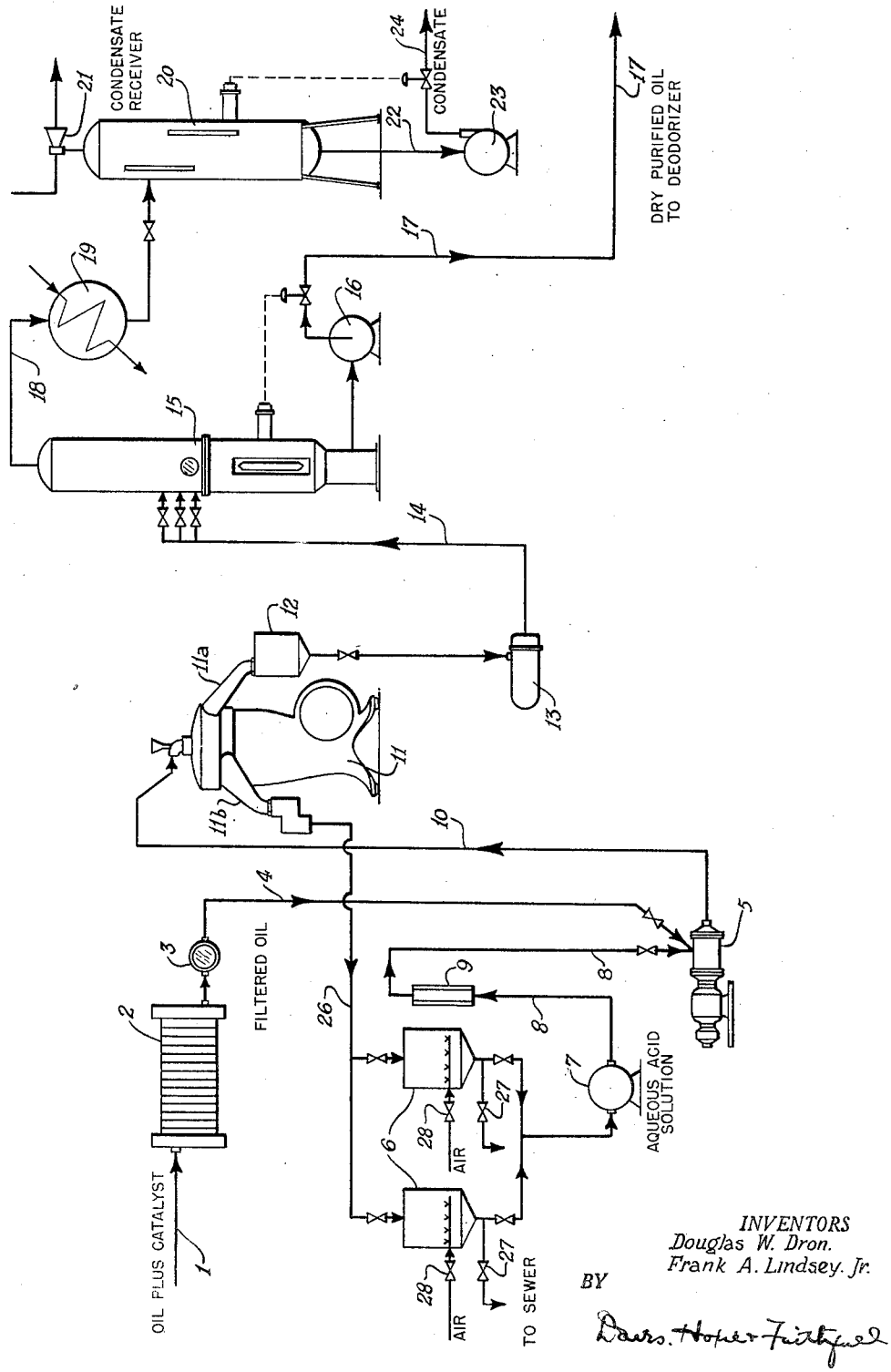

2,650,931

UNITED STATES PATENT OFFICE 2,650,931

METHOD OF REMOVING METALLIC CONTAMINANTS FROM HYDROGENATED OILS

Douglas W. Dron, Poughkeepsie, N. Y., and Frank A. Lindsey, Jr., Fredericksburg, Va., assignors to The De Laval Separator Company, New York, N. Y., a corporation of New Jersey Application March 30, 1951, Serial No. 218,312

7 Claims. (Cl. 260—409)

This invention relates to the processing of hydrogenated vegetable and animal fats or oils, and particularly to an improved process for removing metallic contaminants therefrom.

When vegetable or animal oils have been hydrogenated, they contain trace metals, such as nickel, copper and iron. Since these metals are usually either in solution or in a finely divided state, they are not removed by the usual filtration of the oil for removal of the catalyst used in the hydrogenation. Accordingly, in the edible oil industry, at least, it is generally necessary to subject the hydrogenated oil to further treatment for extracting the trace metals, since these contaminants, if left in the oil, are likely to cause an instability which results in color reversion and an increase in the peroxide value of the oil.

Heretofore, it has been the general practice in the edible oil industry to remove these metallic contaminants by post-bleaching of the hydrogenated oil, usually by adding adsorbent clay to the oil in a batch mixing vessel, followed by filtration of the oil. However, this procedure leaves much to be desired, not only in its effectiveness in removing the metal contaminants completely, but in its economy and speed of operation as well.

The principal object of the present invention is to provide a process for the purpose described, in which the metallic contaminants are removed more completely from the hydrogenated oil, and more rapidly and at lower cost, than has been possible heretofore.

According to the invention, the filtered oil from the catalyst filter, where all the contaminants except the trace metals are removed, is intimately mixed with an aqueous solution of an acid in which the metallic salts are soluble. This mixture of oil and aqueous acid solution is then subjected to a continuous centrifuging operation in which the aqueous acid solution is centrifugally separated from the cleaned oil. As the oil from the centrifugal separator will contain small amounts of water moisture, it is therefore dehydrated, as by feeding it to a vacuum dryer. The dry oil discharging from the vacuum dryer is now ready for further processing, such as deodorization. For all practical purposes, it will be free of any metallic contaminants which might cause instability. The aqueous acid solution discharged from the centrifuge may be reused until completely spent, depending upon the concentration of metallic contaminants present in it.

The acid used in the process may be any acid capable of dissolving the metallic salts in the hydrogenated oil. However, we prefer to use only weak acids which will dissolve the metallic salts, such as citric acid, tartaric acid, phosphoric acid, etc. Thus, the acid will not have an objectionable corrosive effect on the metals used in the equipment for carrying out the process. The concentration of the acid in the aqueous solution should normally be low, for example, in the order of 2%, and the amount of this acid solution mixed with the hydrogenated oil should also be in a minor proportion, for example, about 10% of the amount of oil.

Due to the intimate mixture of the acid solution and the oil, the acid either dissolves the metallic contaminants in the oil or forms with these contaminants oil-insoluble compounds. In either case, the subsequent centrifuging operation serves to separate the oil from the acid solution and the contaminants, since both the acid solution and the oil-insoluble compounds are heavier than the oil. In the centrifugal bowl or locus of centrifugal force of the centrifuge, the mixture is separated into an inner layer, consisting mainly of the oil, and an outer layer comprising the acid, water and any oil-insoluble compounds resulting from the reaction of the acid solution with the metallic contaminants. These layers are separately and continuously discharged from the bowl while fresh mixture is being fed into the bowl. Accordingly, the centrifuge continuously discharges, as one separated component, oil which is metal-free and of high stability, and, as a second separated component, an aqueous acid solution in which the metallic contaminants are dissolved or suspended.

An example of the practice of the invention will now be described in connection with the accompanying drawing, in which the single illustration is a schematic view of a plant for use in carrying out the process.

Referring to the drawing, the oil from the hydrogenating apparatus (not shown) is delivered through a pipe 1 to a filter press 2. Since the hydrogenation is effected in the usual manner with the use of a catalyst, hydrogenated oil flowing through the pipe 1 will contain some of the catalyst material. The filter press 2 serves to remove this catalyst material from the hydrogenated oil. However, the metallic contaminants in the oil, which may be nickel, copper or iron, are either in solution or in a finely-divided condition. Therefore, they cannot be removed from the oil to any appreciable extent by means of the filter 2.

The filtered oil with its metallic contaminants is fed through an observation glass 3 and pipe line 4 to a mixing device 5 of any suitable type adapted to effect an intimate mixture of two different liquids, for example, the type used for mixing vegetable or animal oils with an alkaline refining agent. An aqueous solution of a weak acid, such as citric acid, is delivered continuously to the mixer 5 from supply tanks 6 by way of a pump 7 and a feed line 8 leading to the mixer. The feed line 8 includes a metering device 9. Preferably, the concentration of the acid in the solution delivered from the tanks 6 is in the order of 2%, and the pump 7 is adjusted to feed the solution to the mixer 5 at a predetermined rate such that the amount of acid solution in the mixer is approximately 10% of the amount of oil.

The oil and acid solution are fed in an intimately mixed condition from the mixer 5 through a pipe 10 to a centrifugal separator 11. The separator 11 is of the type which is adapted to discharge two separated components of a mixture separately through outlets 11a and 11b, respectively. In the centrifuge bowl or locus of centrifugal force, the mixture is separated into a purified oil component forming an inner layer, and an impurity component comprising the aqueous acid solution and the metallic contaminants dissolved or suspended therein, the latter component being heavier than the oil and therefore forming an outer layer. The purified oil component and the acid solution component are discharged continuously through the centrifuge outlets 11a and 11b, respectively.

The oil discharging through the centrifuge outlet 11a will contain a small amount of water moisture from the aqueous acid solution. In order to remove this moisture from the oil, the latter is collected in a tank 12 from the centrifuge outlet 11a and passed through a vacuum trap 13 and a pipe line 14 to a vacuum dryer 15, where the oil is dehydrated. The dehydrated oil passes from the lower portion of the dryer 15 through a pump 16 to a pipe line 17 which may be arranged to feed the oil to a further processing stage (not shown) such as a deodorizer. In the vacuum dryer 15, the moisture is removed from the oil in the form of vapor, and this vapor is fed from the top of the dryer to a pipe 18 and a condenser 19. The condensate from the condenser 19 passes through a condensate receiver 20 which is connected at its upper portion to a steam ejector 21. From the lower portion of the receiver 20, the condensate passes through a pipe 22 and a pump 23 to a condensate discharge line 24.

The acid solution or heavier component discharged from the centrifuge outlet 11b is delivered to a pipe 26 which returns it to the supply tanks 6. Thus, the aqueous acid solution is reused in the system by recirculating it through the feed pipe 8 to the mixer 5, where it is mixed with the stream of hydrogenated oil passing continuously to the mixer from the filter 2. This recirculation of the acid solution can be continued until the solution is completely spent or saturated with the metallic contaminants from the oil. The spent acid solution can be discharged from the system through valves 27. If desired, air supply valves 28 may be connected to the acid solution tanks 6 for aerating the solution.

We claim:

1. A method for treating hydrogenated vegetable or animal oil to remove therefrom metallic contaminants resulting from the hydrogenation, which comprises feeding the oil through a filtering zone to remove catalyst material remaining in the oil after the hydrogenating operation, passing the filtered oil from said zone through a mixing zone and there mixing it intimately with an aqueous solution of an acid in which the metallic contaminants are soluble, feeding the mixture from said last zone to a locus of centrifugal force and there separating it into an inner layer comprising cleaned oil and an outer layer comprising an aqueous acid solution in which the metallic contaminants are dissolved or suspended, and continuously and separately discharging oil and acid solution from the respective layers and said locus.

2. A method according to claim 1, comprising also the step of dehydrating the oil discharged from said locus.

3. A method according to claim 1, comprising also the step of returning at least part of the acid solution from said locus to said mixing zone for mixture with fresh oil from the filtering zone.

4. A method according to claim 1, in which the concentration of acid in said solution is in the order of 2%.

5. A method according to claim 1, in which the concentration of acid in said solution is in the order of 2%, and the amount of acid solution fed to the mixing zone is approximately 10% of the amount of oil.

6. A method according to claim 1, in which said aqueous solution is a solution of a weak acid in which the metallic salts are soluble.

7. A method according to claim 1, in which said aqueous solution is a solution of an acid selected from the group consisting of citric acid, tartaric acid and phosphoric acid.

DOUGLAS W. DRON.
FRANK A. LINDSEY, Jr.

References Cited in the file of this patent

UNITED STATES PATENTS

| Number | Name | Date |
|---|---|---|
| 2,207,712 | Blaso | July 16, 1940 |
| 2,547,014 | Kirby | Apr. 3, 1951 |

OTHER REFERENCES

Bailey: Industrial Oils and Fat Products. Interscience Pub. Inc., N. Y. C., 1945, p. 587.